(12) United States Patent
Sim et al.

(10) Patent No.: US 7,937,746 B2
(45) Date of Patent: May 3, 2011

(54) APPARATUS AND METHOD FOR HIERARCHICALLY CONNECTING DEVICES

(75) Inventors: Sang-gyoo Sim, Suwon-si (KR); Yun-sang Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1100 days.

(21) Appl. No.: 11/711,671

(22) Filed: Feb. 28, 2007

(65) Prior Publication Data

US 2007/0250908 A1 Oct. 25, 2007

(30) Foreign Application Priority Data

Apr. 25, 2006 (KR) ........................ 10-2006-0037272

(51) Int. Cl.
*H04L 29/06* (2006.01)
(52) U.S. Cl. ........................................................ 726/3
(58) Field of Classification Search ..................... None
See application file for complete search history.

(56) References Cited

U.S. PATENT DOCUMENTS

| 6,263,435 | B1 | 7/2001 | Dondeti et al. |
| 7,103,661 | B2* | 9/2006 | Klein .......................... 709/225 |
| 2003/0217262 | A1* | 11/2003 | Kawai et al. ................. 713/153 |
| 2005/0149758 | A1 | 7/2005 | Park |
| 2005/0246763 | A1* | 11/2005 | Corcoran et al. ................. 726/3 |
| 2005/0257260 | A1 | 11/2005 | Lenoir et al. |
| 2007/0002899 | A1* | 1/2007 | Raman et al. ................. 370/469 |

FOREIGN PATENT DOCUMENTS

| EP | 1542399 A1 | 6/2005 |
| JP | 2001-103574 A | 4/2001 |
| JP | 2001-352321 A | 12/2001 |
| KR | 10-2005-0013585 A | 2/2005 |
| KR | 10-2005-0051440 A | 6/2005 |
| WO | 03/107589 A1 | 12/2003 |

* cited by examiner

*Primary Examiner* — Minh Dinh
*Assistant Examiner* — Venkat Perungavoor
(74) *Attorney, Agent, or Firm* — Sughrue Mion, PLLC

(57) ABSTRACT

An apparatus and method for hierarchically connecting devices are provided. The apparatus includes a controller that determines at least one of whether an authentication value of a layer including a second device to be connected to a first device is valid, and whether a connection has been granted to the layer including the second device, and a generator that generates an authentication value of a layer including the first device, when the first and the second devices are connected.

11 Claims, 7 Drawing Sheets

APPARATUS AND METHOD FOR HIERARCHICALLY CONNECTING DEVICES

CROSS-REFERENCE TO RELATED APPLICATION

This application claims priority from Korean Patent Application No. 10-2006-0037272 filed on Apr. 25, 2006 in the Korean Intellectual Property Office, the disclosure of which is incorporated herein in its entirety by reference.

BACKGROUND OF THE INVENTION

1. Field of the Invention

The present invention relates to an apparatus and method for hierarchically connecting devices, and more particularly, to an apparatus and method for hierarchically connecting devices, in which a network can be efficiently managed by hierarchically connecting the devices.

2. Description of the Related Art

In line with developments in telecommunications systems, a variety of networks are now available. Especially, home networks, in which consumer electronics (CE) are connected to a network by adding telecommunication features thereto, are becoming popular.

In general, a home network is managed by a home network server, and devices included in the home network are directly connected to the home network server or are indirectly connected thereto via other devices connected to the home network server. In addition, the devices in the home network may be directly connected to each other without being connected to the home network server.

In an environment where various connections are available, such as a home network, authentication and approval must be carried out in order to establish a connection between devices. Generally, the authentication and the approval are carried out based on a fixed network.

Figure 1:
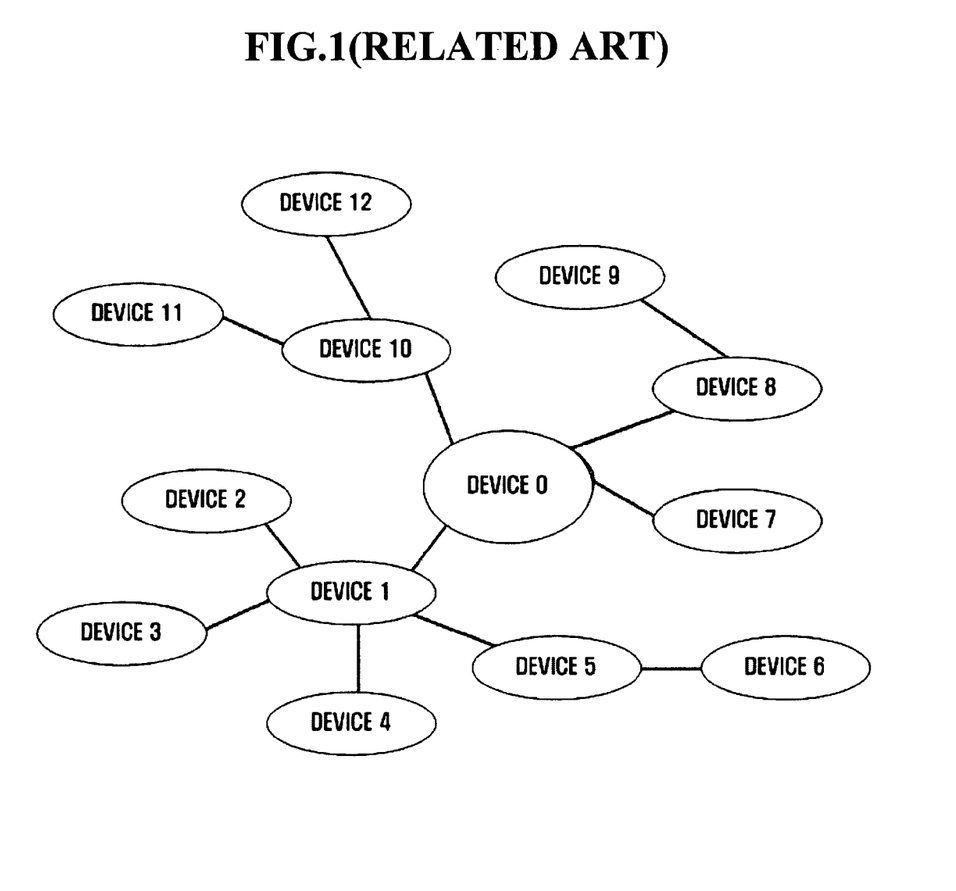
FIG. 1 illustrates a mobile connection among related art devices.

FIG. 1 illustrates a mobile connection among related art devices.

A network configuration among devices centering around a device 0 is illustrated as an example.

The device 0 is the center of the network, and may function as a server.

A device 1 is directly connected to the device 0, and works as a relay indirectly connecting other devices to the device 0. For example, a device 6 may be indirectly connected to the device 0 via a device 5 and the device 1, and devices 2, 3, and 4 may be indirectly connected to the device 0 via the device 1.

In addition to the device 1, a device 10 and a device 8 are directly connected to the device 0, and work as relays indirectly connecting other devices to the device 0.

Figure 2:
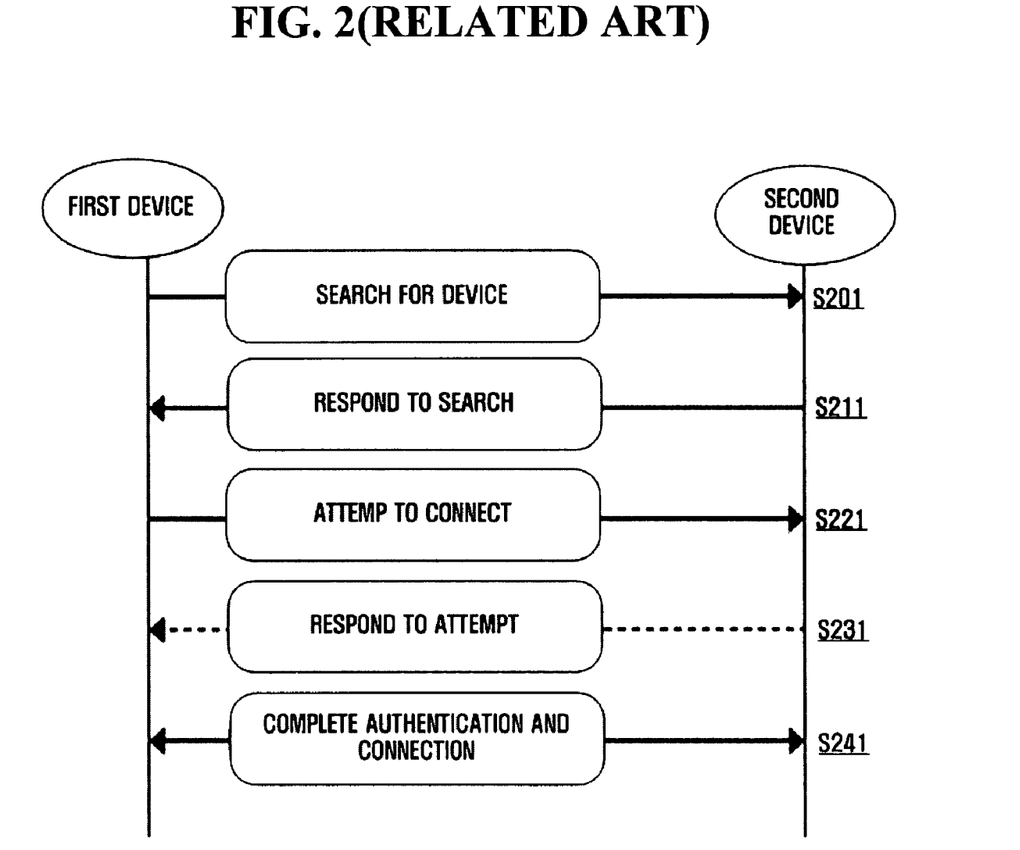
FIG. 2 is a flow chart illustrating a connection method among related art devices.

FIG. 2 is a flow chart illustrating a connection method among related art devices.

As illustrated as an example in FIG. 2, a first device is attempting a connection to a second device.

A method of completing the connection between the first device and the second device includes searching for a device that will work as a relay in order for the first device to detect the second device (S201), finding out whether the first device can be connected to the second device by transmitting a response to the search of the first device carried out by the second device (S211), making an attempt for the first device to be connected to the second device (S221), transmitting a response to the connection attempt from the second device to the first device (S231), and completing authentication and the connection based on the connection between the first and the second devices (S241).

Here, step S231 may be included in step S241 according to the type of protocol used in step S241 and the method of embodiment, and thus, may be omitted.

In step S241, authentication is executed between the first and the second devices using a cross authentication scheme, or in one of the devices using a one-way authentication scheme. For example, setting the first device to a server and the second device to a client, the first device may use the one-way authentication scheme when the second device wishes to use data in the first device.

Hereinafter, step S241 will be described in more detail with reference to FIG. 3.

Figure 3:
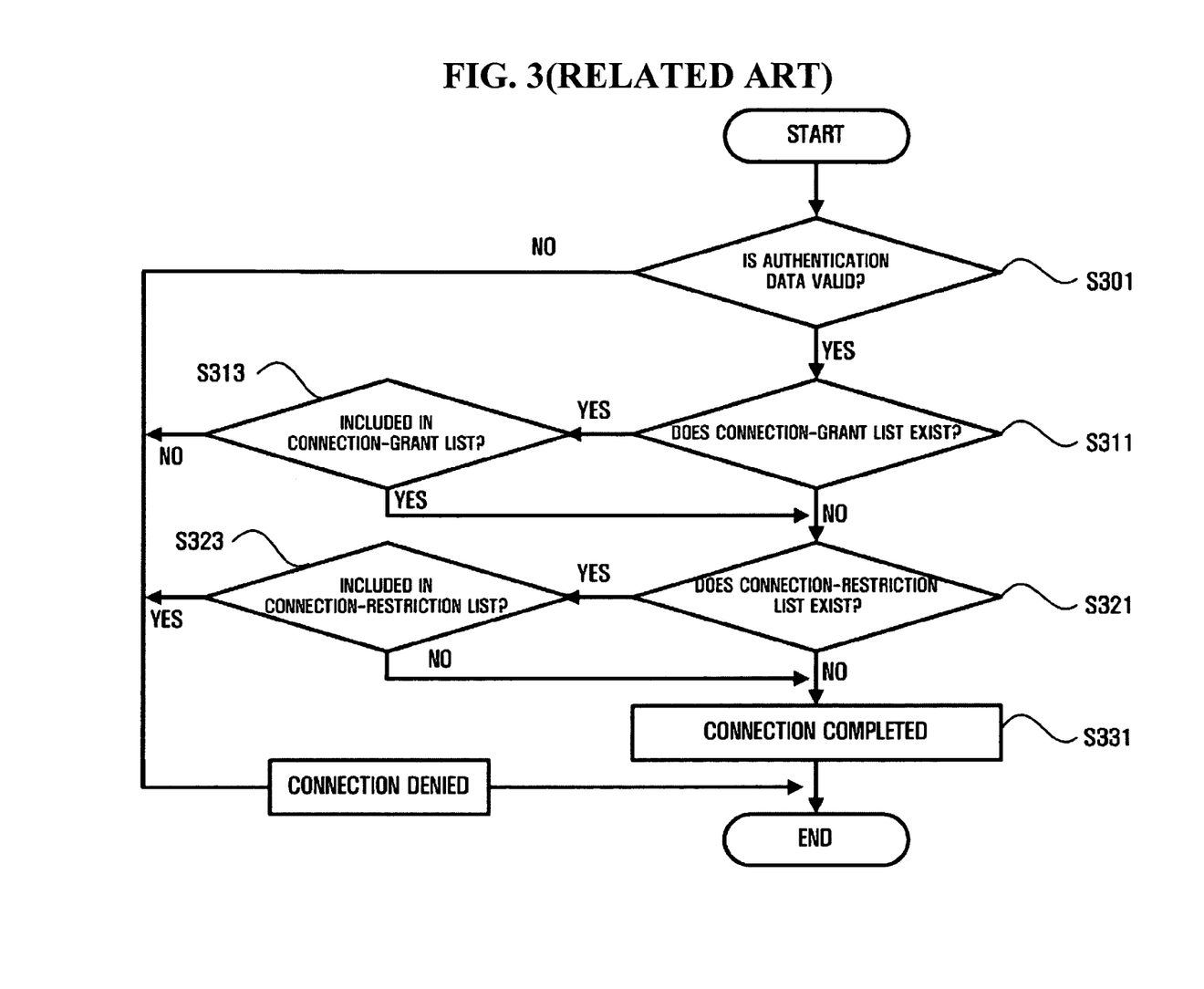
FIG. 3 is a flow chart illustrating a process of completing authentication and connection between two devices.

FIG. 3 is a flow chart illustrating a process of completing authentication and connection between two devices.

The process of completing the authentication and the connection between the two devices includes determining whether authentication data is valid, checking whether a device to connect to is included in an connection-grant list if the connection-grant list exists, and checking whether the device to connect to is included in an connection-restriction list if the connection-restriction list exists. The order of steps may vary depending on the technical implementation of the present invention. For example, the connection-grant list and the connection-restriction list may be respectively checked, and then the validity of the authentication data may be determined. Hereinafter, the detailed information will be given for each step.

First, a first device determines whether authentication data of a second device is valid (S301). If the authentication data is not valid, the first device refuses to be connected to the second device. Otherwise, the next step S311 is executed.

In order to determine whether the authentication data is valid, if the first device transmits a challenge value to the second device that creates an electronic signature value, and the second device re-transmits it to the first device, the first device determines the electronic signature value.

If the authentication data is valid, the first device determines whether a connection-grant list exists (S311). If the connection-grant list exists, the fist device checks whether the second device is included in the connection-grant list (S313).

Here, if the second device is not included in the connection-grant list, the first device denies the connection to the second device. Otherwise, the next step S321 is executed.

The first device determines whether a connection-restriction list exists (S321). If the connection-restriction list exists, the first device checks if the second device is included in the connection-restriction list (S323).

The first device denies the connection to the second device when the second device is included in the connection-restriction list. Otherwise, the first device completes the connection to the second device (S331).

As described above, devices should use a connection-grant list or a connection-restriction list, and keep the lists up-to-date in order to complete a connection therebetween.

In order to keep the connection-grant list and the connection-restriction list up-to-date, the devices should exchange the lists or update them via a trusted central server. If the devices have the different connection-grant list or connection-restriction list, it is hard to establish and apply a consistent security policy.

Therefore, there is a growing need for a method of efficiently connecting devices.

SUMMARY OF THE INVENTION

The present invention provides an apparatus and method for hierarchically connecting devices.

According to an aspect of the present invention, there is provided an apparatus for hierarchically connecting devices, the apparatus including a controller that determines at least one of whether an authentication value of a layer including a second device to be connected to a first device is valid, and whether a connection has been granted to the layer including the second device; and a generator that generates an authentication value of a layer including the first device, when the first and the second devices are connected.

According to another aspect of the present invention, there is provided a method of hierarchically connecting devices, the method including determining at least one of whether an authentication value of a layer including a second device to be connected to a first device is valid, and whether a connection has been granted to the layer including the second device; and generating an authentication value of a layer including the first device, when the first and the second devices are connected.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Figure 4:
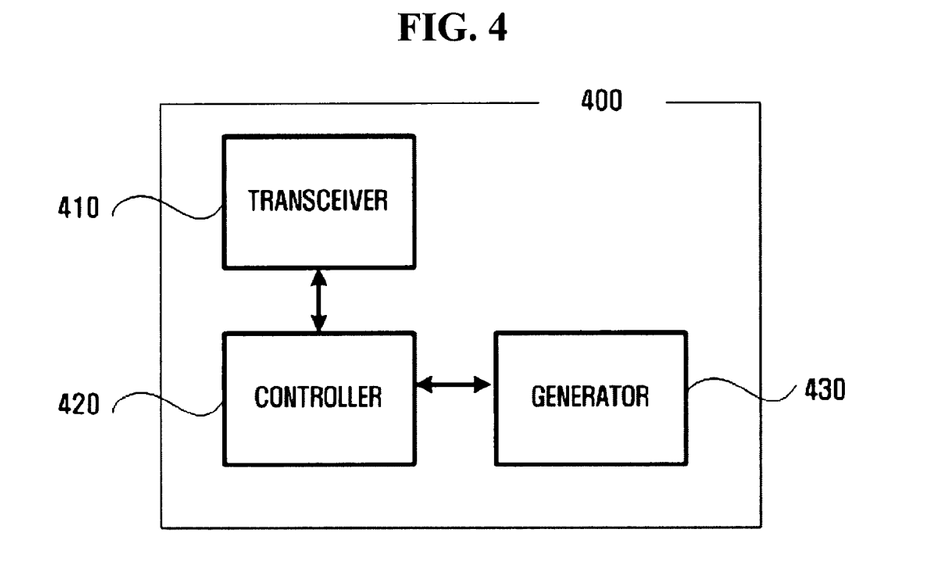
FIG. 4 is a block diagram illustrating hierarchically connected devices according to an exemplary embodiment of the present invention.

FIG. 4 is a block diagram illustrating hierarchically connected devices according to an exemplary embodiment of the present invention.

A hierarchical connection device 400 includes a transceiver 410, a controller 420, and a generator 430.

The transceiver 410 transmits data to and receives data from other devices.

For example, authentication data can be transmitted to and received from other devices via the transceiver 410, or a lower layer device can receive an authentication value from an upper layer device. The authentication value authenticates the fact that the device is in a specific layer. In addition, the upper layer device refers to a group of devices in a layer closer to a server compared with the lower layer device, and may include the highest layer device. Generally, the highest layer device works as a server directly or indirectly connected to the devices in the network.

The controller 420 determines at least one of whether an authentication value of a layer including the second device, which is to be connected to the first device, is valid, and whether a connection has been granted to the layer including the second device.

The authentication value of the layer including the second device is received from the upper layer device, when the connection to the upper layer device has been completed. When the first device is to connect to the second device, the second device transmits its authentication value to the first device.

Therefore, the first device determines whether the authentication value of the layer including the second device is valid, and whether the connection has been granted thereto. However, if the first device has been connected to a third device that is in the same layer as the second device, the determining of whether the authentication value of the layer including the second device is valid, and whether the connection has been granted thereto is omitted, and the first device is immediately connected to the second device.

The generator 430 generates an authentication value of a layer including the first device, if the first and the second devices have been connected.

The first device receives the authentication value of the layer in which it is included, and stores the value. That is, the authentication value of the layer including the first device is generated by the device in an upper layer of the first device, and is transmitted to the first device.

Here, the authentication value of the layer including the first device may include at least one of a value of the layer including the first device and a path value of the first device connected to the second device (hereinafter, referred to as "connection path value").

In addition, the first device may complete the connection to the third device in the same layer as the second device. If the first device receives the authentication value in the layer including the first device from the device in the upper layer of the first device, the first device may immediately complete connection to the second device by the received authentication value of the layer including the first device.

A method of hierarchically connecting devices will be described in more detail with reference to FIGS. 5 through 7.

Here, the term "module" means, but is not limited to, a software or hardware component, such as a Field Programmable Gate Array (FPGA) or an Application Specific Integrated Circuit (ASIC), which executes certain tasks. A module may advantageously be configured to reside in the addressable storage medium, and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 5:
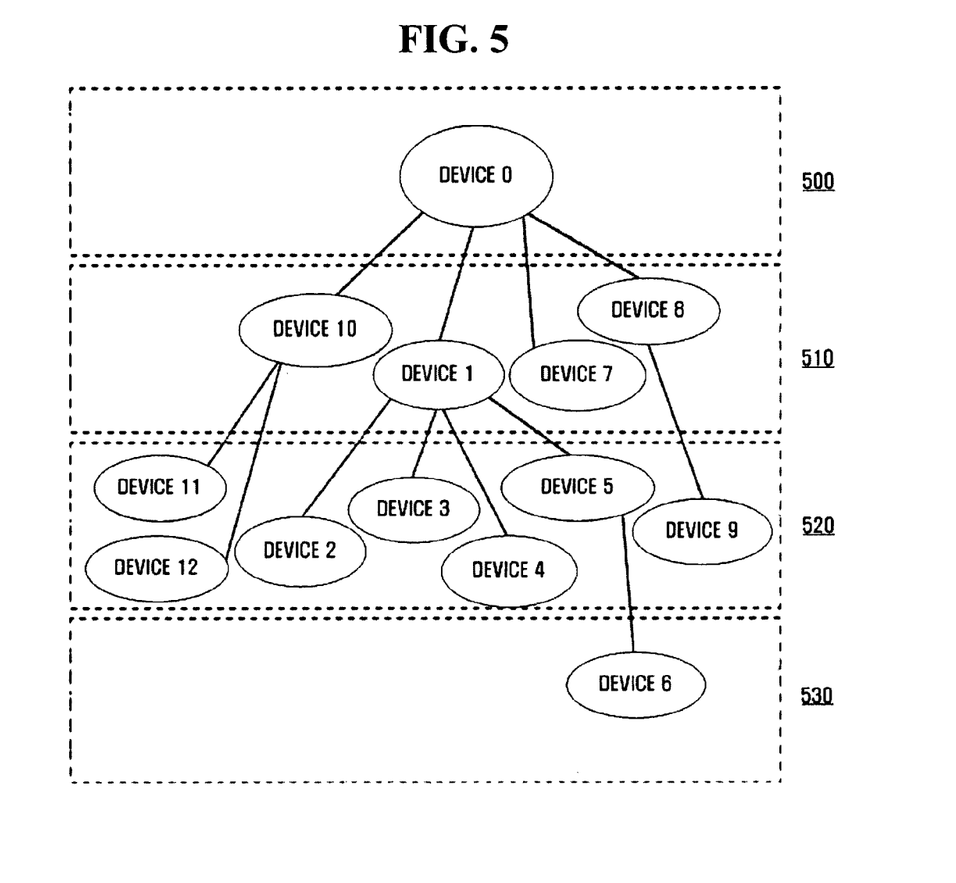
FIG. 5 illustrates a hierarchical connection arrangement of devices according to an exemplary embodiment of the present invention.

FIG. 5 illustrates a hierarchical connection arrangement of devices according to an exemplary embodiment of the present invention.

Referring to FIG. 5, for example, the devices in FIG. 1 are hierarchically rearranged.

A device connected to a device in a highest layer 500 via a device in a first layer 510 appertains to a second layer 520, and a device connected to the first layer 510 via the second-layer device appertains to a third layer 530. That is, a device that can be connected to the highest-layer device by being connected to an upper-layer (hereinafter, referred to as "kth layer") device appertains to a lower layer (hereinafter, referred to as "(k+1)th layer").

The highest-layer device, i.e. a device 0 works as a server in a network, and is directly or indirectly connected to devices in the network.

In addition, the upper-layer device refers to a group of devices closer to the server than the lower-layer device, and may include the highest-layer device.

The devices receive their authentication value from the upper-layer device, and store it. The authentication value indicates a specific layer including the device.

For example, the first device in the k+1th layer appertains to at least one of kth layer, (k−1)th layer, (k−2)th layer, . . . , and the highest layer, which are upper layers of the k+1th layer, and receives authentication value of the k+1th layer generated by the device directly or indirectly connected to the first device.

Here, the first device appertaining to the k+1th layer must be connected to the upper-layer device in order to receive its authentication value.

The authentication value in the layer including the first device includes at least one of a layer value of the layer including the first device, and a connection path value for a device to be connected to the first device.

For example, when the first device appertaining to the k+1th layer is connected to the highest-layer via a second device appertaining to the kth layer, the first device may include the authentication value and the value for the connection path from the first device through the highest-layer device, and generate an authentication value of the layer including the first device.

Here, if the second device is directly connected to the highest-layer device, and receives an authentication value of the layer including the second device therefrom, the authentication value of the layer including the second device includes the value of the connection path from the second device to the highest-layer device.

Accordingly, the value of the connection path from the second device to the highest-layer device may be included, when the first and the second devices have been completely connected to each other and the second device generates the authentication value of the layer including the first layer including the value of the connection path from the first device through the second device.

Setting a value of the highest layer 500, for example, to 0, the first layer 510 value is 1, the second layer value 520 is 2, . . . , the kth layer value is k, respectively.

Figure 6:
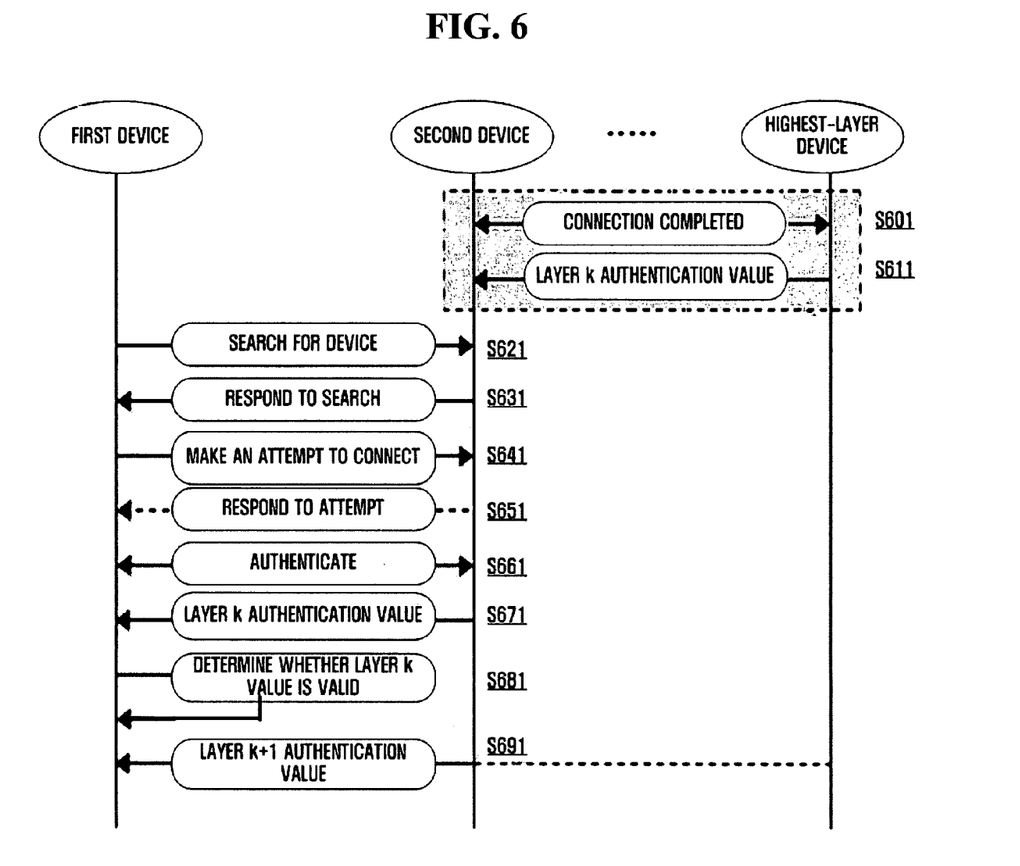
FIG. 6 is a flow chart illustrating a hierarchical connection of devices according to an exemplary embodiment of the present invention.

FIG. 6 is a flow chart illustrating a hierarchical connection of devices according to an exemplary embodiment of the present invention.

Referring to FIG. 6, a first device is connected to a second device in kth layer, and appertains to k+1th layer.

For example, if the second device is in the first layer 510 (k=1), it may be directly connected to the highest-layer device. If the second device is in the kth layer (k>1), it may be indirectly connected to the highest-layer device. The indirect connection is established via other devices, and the direct connection is established without being connected to other device.

Therefore, the second device (if k≧1) is directly or indirectly connected to the highest-layer device, and receives an authentication value of a layer including the second device from the highest-layer device via a transceiver 410 (S601 and S611).

The authentication value of the layer including the second device is transmitted via a generator 430 to the second device by the highest-layer device.

When the first device is connected to the highest-layer device via the second device in the kth layer, the following steps are executed. First, the first device searches for a device to connect to, i.e. the second device, in order to detect the second device (S621). The second device finds out whether the first device can be connected to the second device by transmitting a response to the search made by the first device (S631). Then, the first device is making an attempt to connect to the second device (S641), and the second device transmits a response to the attempt made by the first device (S651). The aforementioned steps S621 through S651 correspond to steps S201 through S231 in FIG. 2.

Next, authentication between the first and the second devices is executed (S661).

The authentication may be executed in the first and the second devices (cross authentication) or in one of the devices (one-way authentication). For example, if the first device is a server and the second device is a client, the first device may use the one-way authentication scheme when the second device uses the first device data.

The first device receives the authentication value of the kth layer including the second device via the transceiver 410, and determines whether the kth layer authentication value is valid and whether a connection has been granted thereto via a controller 420 (S671 and S681).

The first device completes the connection to the second device, if the authentication value of the layer including the second device is valid and the connection has been granted to the kth layer. If the first device has completed the connection to a third device in the same layer as the second device prior thereto, the first device has already received the authentication value of the layer including the first device from the upper-layer device, and has stored the value. Here, the upper-layer device may be the highest-layer device or the third device in the same layer as the second device. Therefore, the first device, when connected to the second device, checks the authentication value of the layer including the first device, and immediately completes the connection to the second device in the same layer.

Next, when the connection between the first and the second devices has been completely established, the upper-layer device generates the authentication value of the layer (k+1th layer) including the first device via the generator 430, and transmits the value to the first device (S691).

The upper-layer device may be the highest-layer device or the second device. In addition, if the second device is in the kth layer (k>1) and there is another device between the first and the second devices, thereby making the devices in the upper layer plural, one of the devices in the upper layer may generate the authentication value of the layer including the first device, and transmit the authentication value to the first device. As described above, there may be several devices in the upper layer of the first device and the authentication value of the layer including the first device may be generated according to the hierarchical configuration and technical implementation.

Hereinafter, steps S661 through S681 will be described more in detail.

Figure 7:
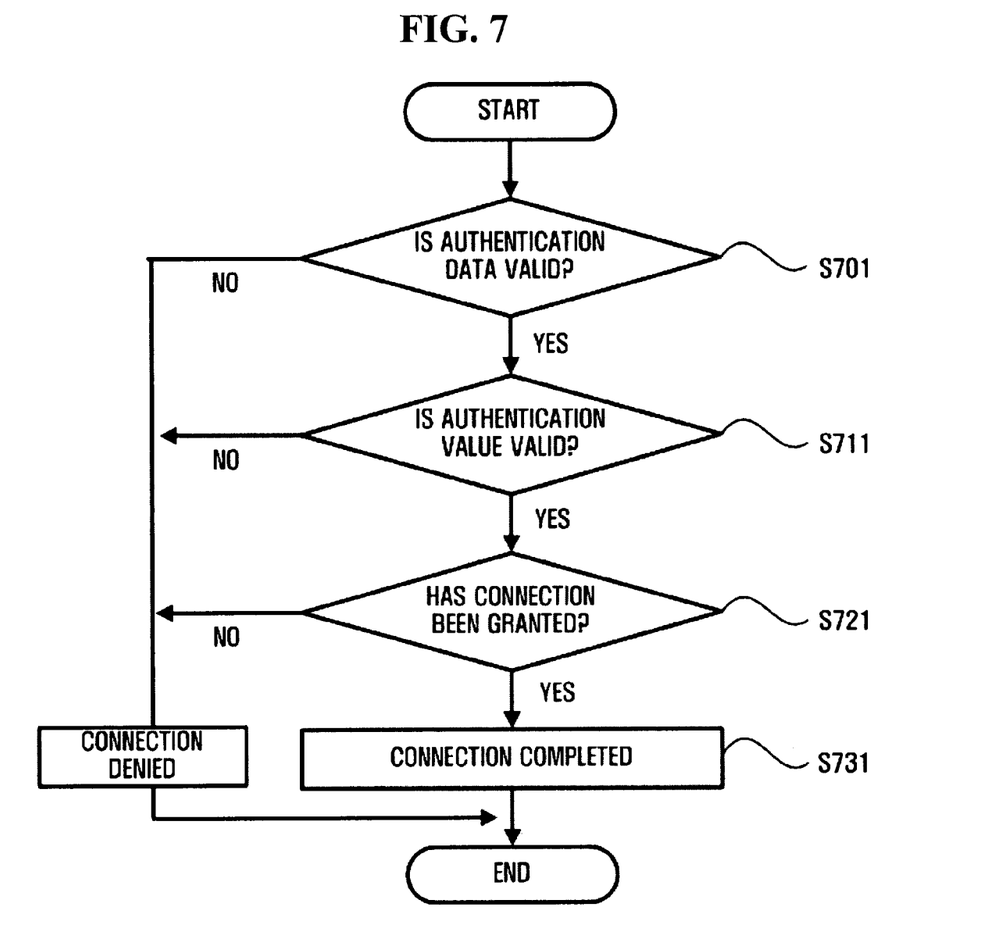
FIG. 7 is a flow chart illustrating authentication between devices and hierarchical connection according to an exemplary embodiment of the present invention.

FIG. 7 is a flow chart illustrating authentication between devices and hierarchical connection according to an exemplary embodiment of the present invention.

A process of completing a connection between devices includes determining whether authentication data is valid, determining whether an authentication value of a layer including a second device is valid, and determining whether a connection has been granted to the layer including the second device.

First, a first device determines whether the authentication data received from the second device is valid via a controller 420 (S701).

Here, a cross authentication scheme may be used to determine whether the authentication data is valid. If the first device determines whether the authentication data of the second device is valid and the data turns out to be invalid, the first device denies the connection to the second device. If the data is valid, step S711 is executed. FIG. 3 can be referred to for the determining of validity.

If the authentication data is valid, the first device determines whether the authentication value of the layer including the second device is valid via the controller 420 (S711).

If the authentication value of the layer including the second device is invalid, a connection to the device 2 is denied, but if the authentication value is valid, step S721 is executed.

In this case, the first device determines whether the connection has been granted to the layer including the second device via the controller 420 (S721).

The first device completes the connection to the second device, if it is determined that the connection has been granted to the layer including the second device (S731).

For example, if the second device is in a third layer and the first device is configured to grant the connection to a device in the second or higher layer, i.e. a first layer, the first device denies the connection to the second device.

As described above, in the related art, connections among devices in a network are established via a connection-grant list or a connection-restriction list, and it is difficult to update and manage the connection-grant list and the connection-restriction list. However, hierarchically arranging and managing the devices according to the exemplary embodiments of the present invention can make the update and the management of the list easier.

Figure 8:
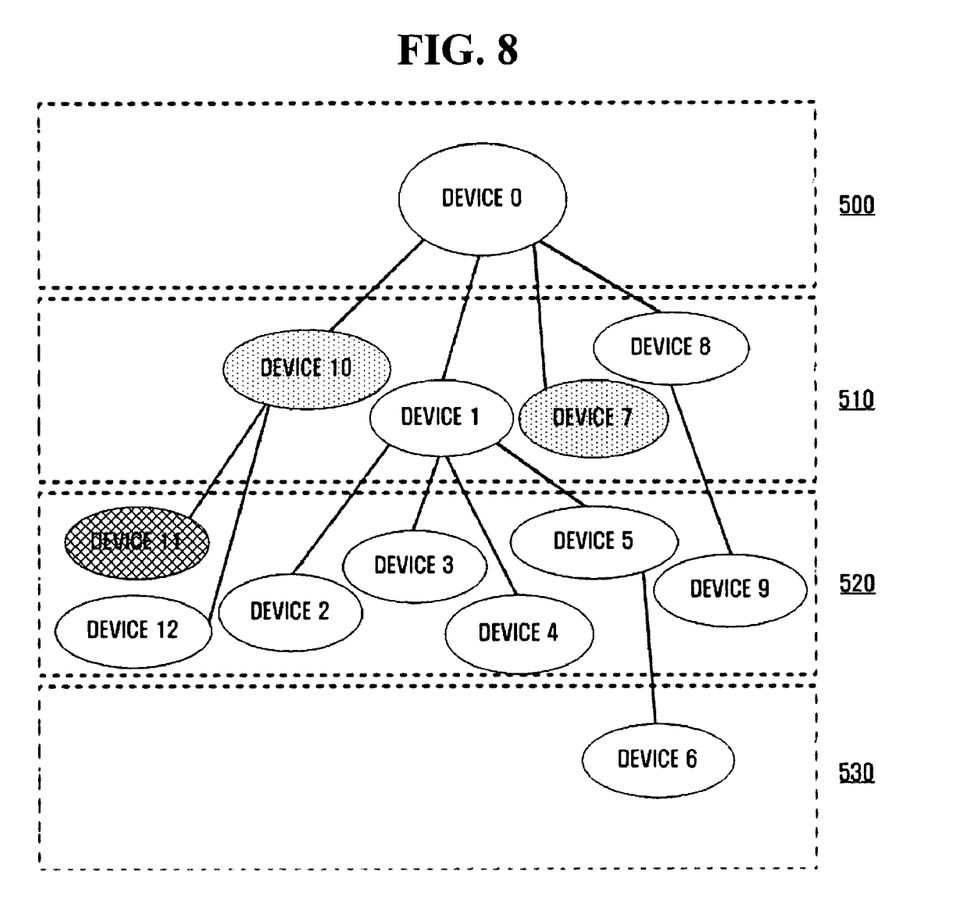
FIG. 8 illustrates a hierarchical connection among devices according to an exemplary embodiment of the present invention.

FIG. 8 illustrates a hierarchical connection among devices according to an exemplary embodiment of the present invention.

Referring to FIG. 8, devices are hierarchically arranged in the highest layer 500, a first layer 510, a second layer 520, and a third layer 530.

First, a device 10 completes a connection to a device 0 in the highest layer 500, and receives an authentication value of the first layer 510 including the device 10 from the device 0. The authentication value of the first layer 510 includes a first-layer value of the device 10 and a value of a connection path from the device 10 to the device 0.

A device 11 is connected to the device 0 via the device 10. The device 11 receives an authentication value of the first layer 510 including the device 10, which is stored in first device 10, and determines whether the authentication value is valid. If the authentication value is valid, the device 11 determines whether a connection has been granted to the first layer 510 including the device 10, and completes the connection to the device 10, if the connection has been granted.

For example, if the device 11 has already completed a connection to a device 7 in the same layer as the device 10 prior to completing the connection to the device 10, the device 11 has received the authentication value including at least one of the value of the layer including the device 11 and the value of a connection path to the highest-layer device. That is, the device 11 has received the authentication value of the layer including the device 11 from an upper-layer device (e.g. device 7 or device 10) and has stored the authentication value of the layer including the device 11. Therefore, the device 11 checks the authentication value of the first layer 510, and can immediately complete the connection to the device 10 in the same layer.

Once the device 11 has completed the connection to the device 10, the device 11 has already received the authentication value of the layer including the device 11 from the device 10 or the device 0. Here, the authentication value of the layer including the device 11 may include the value of the second layer 520 and the value of the connection path to the device 0.

As described above, according to an exemplary embodiment of the present invention, a method of hierarchically connecting devices is advantageous in that when connecting devices that can be applied to an active network such as a home network, a network can be efficiently and stably managed.

The exemplary embodiments of the present invention have been explained with reference to the accompanying drawings, but it will be apparent to those skilled in the art that various modifications and changes may be made thereto without departing from the scope and spirit of the invention. Therefore, it should be understood that the above embodiments are not restrictive but illustrative in all aspects.

What is claimed is:

1. An apparatus for hierarchically connecting devices, the apparatus comprising:
    a processor executing a controller that determines at least one of whether an authentication value of a layer including a second device to be connected to a first device is valid, and whether a connection has been granted to the layer including the second device; and
    a generator that generates an authentication value of a layer including the first device, when the first and the second devices are connected,
    wherein the authentication value of a layer comprises a value that authenticates that a device is in a particular layer of hierarchy, and the authentication value is the same for each device in the layer.

2. The apparatus of claim 1, wherein the authentication value of the layer including the first device is generated by a device in an upper layer of the first device.

3. The apparatus of claim 2, wherein the authentication value of the layer including the first device includes at least one of a value of the layer including the first device and a value of a connection path to the second device.

4. The apparatus of claim 3, wherein, if the first device completes a connection to a third device in the same layer as the second device and receives the authentication value of the layer including the first device from the third device, the first device checks the authentication value of the layer including the first device and immediately completes a connection to the second device.

5. A method of hierarchically connecting devices, the method comprising:
  determining at least one of whether an authentication value of a layer including a second device to be connected to a first device is valid, and whether a connection has been granted to the layer including the second device; and
  generating an authentication value of a layer including the first device, when the first and the second devices are connected,
  wherein the authentication value of a layer comprises a value that authenticates that a device is in a particular layer of hierarchy, and the authentication value is the same for each device in the layer.

6. The method of claim 5, wherein the authentication value of the layer including the first device is generated by a device in an upper layer of the first device.

7. The method of claim 6, wherein the authentication value of the layer including the first device includes at least one of a value of the layer including the first device and a value of a connection path to the second device.

8. The method of claim 7, wherein, if the first device completes a connection to a third device in the same layer as the second device and receives the authentication value of the layer including the first device from the third device, the first device checks the authentication value of the layer including the first device and immediately completes a connection to the second device.

9. The apparatus of claim 1, wherein the particular layer comprises a plurality of devices, each of which are assigned the same authentication value.

10. The apparatus of claim 1, wherein the authentication value of the particular layer is assigned to the device of the particular layer by a device in a higher layer.

11. The apparatus of claim 1, wherein the hierarchically connecting devices are consumer electronic devices of a home network.

* * * * *